United States Patent
Chandrasekharan et al.

(10) Patent No.: US 12,437,033 B1
(45) Date of Patent: Oct. 7, 2025

(54) SMART CONTRACTS FOR LICENSING

(71) Applicant: Splunk Inc., San Francisco, CA (US)

(72) Inventors: Ramkumar Chandrasekharan, San Francisco, CA (US); Nathaniel G. McKervey, Tallahassee, FL (US); Kishore Reddy Ramasayam, San Francisco, CA (US); Antoine Toulme, San Francisco, CA (US)

( * ) Notice: Subject to any disclaimer, the term of this patent is extended or adjusted under 35 U.S.C. 154(b) by 430 days.

(21) Appl. No.: 17/589,713

(22) Filed: Jan. 31, 2022

(51) Int. Cl.
*G06F 21/10* (2013.01)
*H04L 9/08* (2006.01)

(52) U.S. Cl.
CPC ....... *G06F 21/105* (2013.01); *G06Q 2220/18* (2013.01); *H04L 9/0825* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 9,817,867 | B2* | 11/2017 | Hsieh | G06F 16/211 |
| 10,169,434 | B1* | 1/2019 | Block | G06F 16/2228 |
| 10,762,478 | B1* | 9/2020 | Maeng | G06Q 20/3678 |
| 11,308,487 | B1* | 4/2022 | Foster | G06Q 20/3829 |
| 11,423,398 | B1* | 8/2022 | Mullins | G06Q 20/36 |
| 11,836,723 | B2* | 12/2023 | Alt | G06F 21/105 |
| 2018/0018723 | A1* | 1/2018 | Nagla | G06Q 30/08 |
| 2018/0075527 | A1* | 3/2018 | Nagla | G06F 21/6218 |
| 2018/0191503 | A1* | 7/2018 | Alwar | H04L 9/3242 |
| 2018/0191714 | A1* | 7/2018 | Jentzsch | G06F 21/445 |
| 2018/0330206 | A1* | 11/2018 | Shyshkov | G06F 16/583 |
| 2019/0236571 | A1* | 8/2019 | Arora | G06Q 20/065 |
| 2019/0279201 | A1* | 9/2019 | Xia | G06F 21/6209 |
| 2019/0325436 | A1* | 10/2019 | Cheng | G06Q 20/3827 |
| 2020/0019616 | A1* | 1/2020 | Sukhija | G06F 16/2365 |
| 2020/0151266 | A1* | 5/2020 | Takeuchi | G06Q 40/08 |
| 2020/0160297 | A1* | 5/2020 | Munk | G06F 16/316 |
| 2020/0167237 | A1* | 5/2020 | Knuhtsen | G06F 3/067 |
| 2020/0167763 | A1* | 5/2020 | Robins | G06Q 40/02 |
| 2020/0167773 | A1* | 5/2020 | Cervenka | G06Q 20/10 |
| 2020/0183950 | A1* | 6/2020 | Gaillardetz | G06F 16/258 |
| 2020/0184557 | A1* | 6/2020 | Wang | G06F 21/6245 |

(Continued)

FOREIGN PATENT DOCUMENTS

WO  WO-2017011601 A1 * 1/2017 ............... G09C 1/00

*Primary Examiner* — Neha Patel
*Assistant Examiner* — Jahed Ali
(74) *Attorney, Agent, or Firm* — Polsinelli P.C.

(57) ABSTRACT

A smart licensing system deploys smart contracts on distributed ledgers. The smart contract includes data regarding a software as a service ("SaaS") provider that will provide services to the holder of the smart contract, a type of the service that will be provided, a quantity of the services that will be provided, conditions to be met when transferring the smart contract to another holder, or any suitable combination thereof. The smart contract may indicate a number of tokens owned by the holder of the smart contract. The holder of the smart contract may transfer some or all of the tokens to the SaaS provider in exchange for services. Remaining tokens may be used at a later date, transferred to another entity, or both. In addition to transferring tokens to the SaaS provider, the requesting entity may be validated before the services are performed.

20 Claims, 8 Drawing Sheets

(56) References Cited

U.S. PATENT DOCUMENTS

| | | | |
|---|---|---|---|
| 2020/0202668 A1* | 6/2020 | Cotta | G07F 17/3281 |
| 2021/0035266 A1* | 2/2021 | Toroman | G06T 11/206 |
| 2021/0117857 A1* | 4/2021 | Sriharsha | G06F 16/24568 |
| 2021/0264419 A1* | 8/2021 | Ratakonda | G06Q 20/389 |
| 2022/0198441 A1* | 6/2022 | Dalton | G06Q 20/227 |
| 2022/0358498 A1* | 11/2022 | Mullins | G06Q 20/36 |
| 2024/0259222 A1* | 8/2024 | Kaplan | H04L 9/30 |

* cited by examiner

500

RECEIVE A REQUEST TO PERFORM AN OPERATION, THE REQUEST COMPRISING DATA THAT IDENTIFIES A FIRST ACCOUNT OF A BLOCKCHAIN AND A TRANSACTION ON THE BLOCKCHAIN, THE TRANSACTION INVOLVING THE FIRST ACCOUNT, THE BLOCKCHAIN IMPLEMENTED ON A PLURALITY OF NODES
502

↓

DETERMINE THAT THE TRANSACTION TRANSFERRED A PREDETERMINED NUMBER OF TOKENS FROM THE FIRST ACCOUNT TO A SECOND ACCOUNT OF THE BLOCKCHAIN, THE TOKENS GENERATED AND MANAGED BY THE BLOCKCHAIN, THE TOKENS ASSOCIATED WITH PERFORMING ONE OR MORE OF A PLURALITY OF OPERATIONS ON A DATA INTAKE AND QUERY SYSTEM
504

↓

BASED ON THE DETERMINATION THAT THE TRANSACTION TRANSFERRED THE PREDETERMINED NUMBER OF TOKENS FROM THE FIRST ACCOUNT TO THE SECOND ACCOUNT, PERFORM THE REQUESTED OPERATION
506

↓

IN RESPONSE TO THE PERFORMANCE OF THE REQUESTED OPERATION, UPDATE THE BLOCKCHAIN TO REMOVE THE PREDETERMINED NUMBER OF TOKENS FROM THE SECOND ACCOUNT
508

SMART CONTRACTS FOR LICENSING

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

A distributed ledger comprises digital data geographically spread across multiple locations or entities. The digital data is replicated, shared, and synchronized between computing nodes storing the digital data. Unlike with a centralized database, no single entity administrates or controls the digital data. A peer-to-peer network is used for communication between the computing nodes. A consensus algorithm is used to resolve discrepancies in data between the computing nodes. Blockchain is a form of distributed ledger.

Each blockchain account has a unique cryptographic key. Only a user with knowledge of the key is permitted to change the contents of the account. Accounts are used to store fungible values (e.g., quantities of currency) and non-fungible tokens (NFTs).

Licenses for software provided as a service (SaaS) are negotiated between the service provider and the customers of the service provider. Division of a license (e.g., between business units of a large customer) is either enforced only by the customer or requires additional work by the SaaS provider.

Digital signatures are used to verify the authenticity of digital messages. A digital signature is generated using a private key of a private key/public key pair. The digital signature is verified using the public key. The signer maintains exclusive control of the private key and distributes the public key. An asymmetric cryptography algorithm used to generate the key pair is cryptographically secure, such that even with the public key and a set of encrypted messages, an attacker is unable to determine the private key with a predetermined amount of computing resources.

BRIEF DESCRIPTION OF THE DRAWINGS

Illustrative examples are described in detail below with reference to the following figures:

FIG. 5 shows a flow diagram of an example method for verifying transactions and performing operations.

DETAILED DESCRIPTION

A smart licensing system deploys smart contracts on distributed ledgers. The smart contract includes data regarding the SaaS provider that will provide services to the holder of the smart contract, a type of the service that will be provided, a quantity of the services that will be provided, conditions to be met when transferring the smart contract to another holder, or any suitable combination thereof.

The smart contract may indicate a number of tokens owned by the holder of the smart contract. The holder of the smart contract may transfer some or all of the tokens to the SaaS provider in exchange for services. Remaining tokens may be used at a later date, transferred to another entity, or both. The smart contract may include a fee for transfer of the smart contract, such that one of the parties to the transfer pays the fee to the SaaS provider. The amount of the fee may be based on the number of tokens transferred, the services of the smart contract, or both.

In addition to transferring tokens to the SaaS provider, the requesting entity may be validated before the services are performed. For example, services may not be performed for entities on a ban list, services may only be performed for entities on a pass list, or both.

Figure 1:
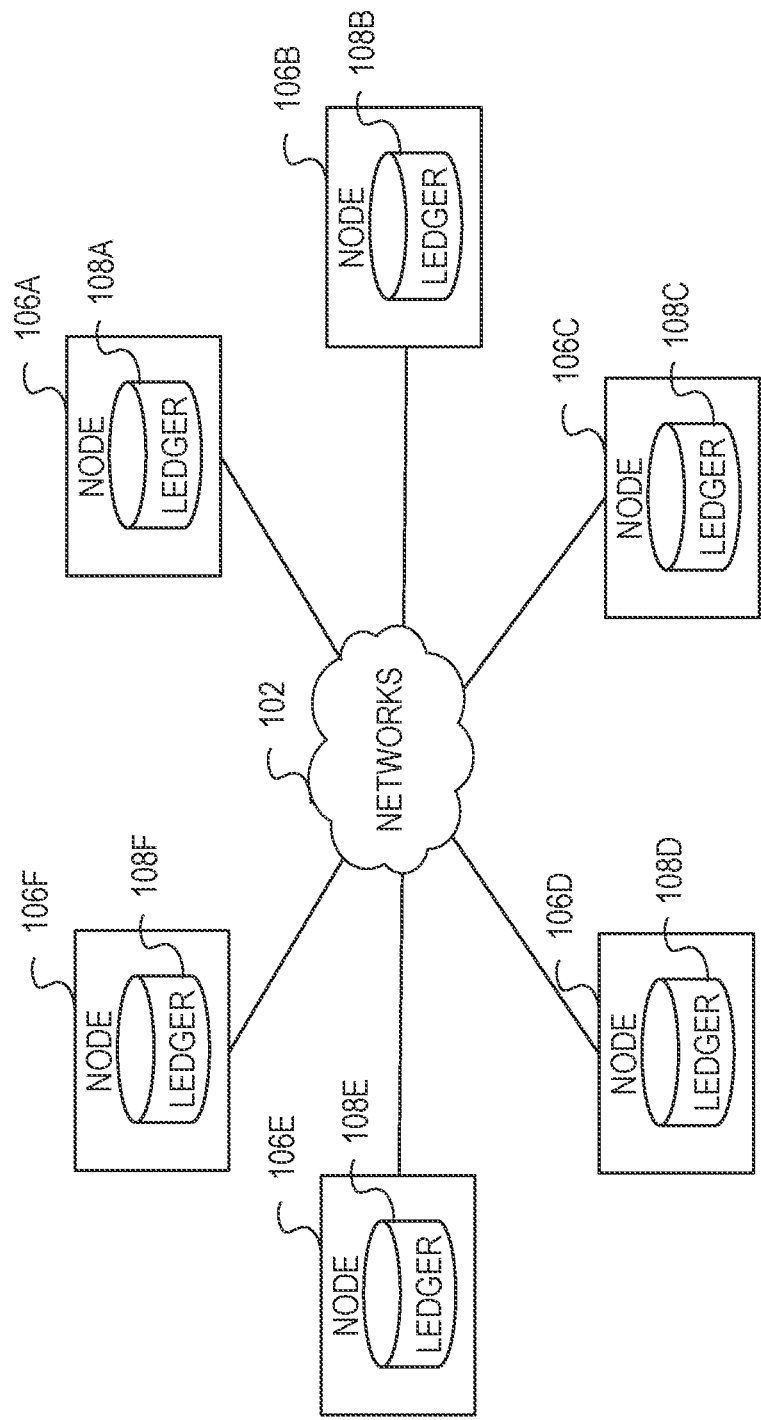
FIG. 1 and FIG. 2 illustrate different types of blockchain architecture as data sources, according to some examples.

FIG. 1 is a block diagram illustrating an example of a distributed ledger system 100 that provides one or more distributed ledgers 108A-108F (generically referred to as ledger(s) 108) or blockchains across one or more nodes 106A-106F (generically referred to as node(s) 106). Non-limiting examples of a distributed ledger system 100 include, but are not limited to, Ethereum, Hyperledger Fabric, Quorum, Guardtime, KSI, etc. The nodes 106 can communicate via a network 102. The network 102 broadly represents one or more LANs, WANs, cellular networks (e.g., LTE, HSPA, 3G, and other cellular technologies), and/or networks using any of wired, wireless, terrestrial microwave, or satellite links, and may include the public Internet. The network 102 can be a public network or a private network. Each node 106 can be implemented using individual computing devices, distributed processing systems, servers, isolated execution environments (e.g., containers, virtual machines), shared computing resources, and so on. In some examples, the nodes 106 can be implemented on the same or as part of different isolated execution environment systems (e.g., as different containers or pods of the same or different Kubernetes cluster or Docker swarm).

In the illustrated example of FIG. 1, each node 106 is shown to include a ledger 108 (which may include more than one ledger), which can be stored across one or more data stores, etc. In some examples, the ledger 108 of each node 106 can include one or more blockchains, etc. In some cases, the ledgers 108 of the different nodes 106 correspond to each other, include the same or matching data entries, or include the same data.

The distributed nodes 106 can store, maintain and/or update their respective ledger 108. Each node 106 can be configured for storing a version of the distributed ledger 108 (or a portion thereof), and the distributed ledger 108 may be updated from time to time with modifications to the ledger 108 and/or ledger entries, such as insertion of a ledger entry (also referred to herein as a block) or an update of a ledger entry. The distributed ledger system 100 may be adapted such that, where issues arise with the distributed ledger 108

(e.g., hash collisions, insertions at the same time, corrupted ledgers/ledger entries), the issues are resolved based at least on issue resolution logic. For example, such logic may be distributed among each of the nodes 106 and/or their computing systems and can be used to improve or ensure consistency between copies of the ledgers 108 at the different nodes. In some examples, issues may arise that can cause a distributed ledger 108 to "fork" and/or spawn another instance, for example, where a collision cannot be automatically resolved between the nodes 106. In such cases, the resolution logic can be used to determine when to "fork" or spawn another instance, etc.

It will be understood that each node 106 can include fewer or more components. For example, each node 106 can include processors, buffers, applications, databases, etc. In some cases, the nodes 106 can include executable instructions or code that when executed by the node 106 cause the node 106 to modify a corresponding ledger 108 or generate a transaction that is to be stored in a block of a blockchain. In some cases, the executable instructions can be chaincode and can be used to implement or execute a smart contract relative to the ledger 108.

As described herein, the nodes 106 can include at least a decentralized set of computing devices and may even include personal computing devices for individuals, and so on. For example, a ledger 108 may be stored on a large number of publicly available devices, each acting as a "node" for storing a copy of the ledger 108 (e.g., being collaboratively maintained by anonymous peers on a network). In some examples, the ledger 108 is only stored and maintained on a set of trusted "nodes", such as on a private network or on the computing systems of authorized users. In some examples, a combination and/or a "mix" of both trusted nodes and public nodes may be utilized, with the same and/or different rules being applied to activities performed at each (e.g., a different validation process may be used for untrusted nodes, or simply untrusted nodes may be unable to perform certain activities). In some examples, there may be different levels of nodes with differing characteristics and applied logic.

The ledgers 108, ledger entries, and/or information stored on the ledger entries may be used to store information received from one or more computing devices. For example, the information may include banking information, other commercial information, smart contracts, etc. Further, the ledger 108 and ledger entries may utilize encryption technology to facilitate and/or validate digital signatures or the data received from the computing devices.

In some examples, the ledger 108 is publicly accessible. In some examples, the ledger 108 is only accessible to select, authorized nodes having the appropriate permissions. In some examples, portions of the ledger 108 are public and portions of the ledger 108 are private. When the ledger 108 is publicly accessible, the ledger 108 may be adapted to only store information incidental to a transaction or a document relating to a transaction, and may be adapted such that identifiable information is removed but validation information is maintained (e.g., storing a hash value computed from the underlying information). Further, the information stored on the ledger 108 may be encrypted (non-limiting example: using a public key of a key pair associated with a host device 106), redacted, compressed, transformed (e.g., through a one-way transformation or a reversible transformation), and so on.

Each of the one or more nodes 106 may have, at various times, versions of the ledger 108, and the ledger 108 may be maintained through the propagation of entries and/or updates that may be copied across ledgers 108. Ledger entries may contain elements of information (e.g., header information and/or other data). There may be various rules and/or logic involved in activities relating to the ledger entries (e.g., creating, updating, validating, deleting); for example, a majority, supermajority, or unanimous consent between nodes may be enforced as a condition to an activity relating to an entry. In some examples, distributed ledgers 108 are utilized and the ledger entries are adapted to have various linkages to one another such that the integrity of the ledger entries can be reinforced and/or validated. For example, the linkages may include hashes computed based on prior entries in the ledger 108, which may be utilized to determine whether a ledger entry is a fraudulent entry by reviewing the correctness of the hash based on performing the hash on information stored on prior entries.

The ledger 108 may be maintained through, for example, a "distributed network system," the distributed network system providing decentralized control and storage of the ledger 108 at the one or more nodes (which may be considered "nodes" of the system). The number of "nodes" may be fixed or vary with time, and increasing or decreasing the number of "nodes" may impact the performance and/or security of the system.

The ledger 108 copies stored and maintained at each "node" provide cross-validation with one another in the event of conflicts between ledgers 108, and various cryptographic and/or hashing algorithms may be utilized during the generation, updating, deletion, linking, and so on, of ledger entries such that ledger entries have increased resiliency to unauthorized tampering or modification. For example, a blockchain ledger 108 may be distributed across nodes 106 and used to track information received from one or more computing devices. The blockchain ledger 108 may have entries linked to one another using cryptographic records, and entries in the blockchain may be ordered, time stamped, and/or associated with metadata. These and other methods can be used for protection against "double" transfers and unauthorized modification of ledger entries.

The ledger 108 may implement smart contracts. A smart contract is a program stored in the ledger that runs when predetermined conditions are met. Smart contracts have many applications. As a simple example, a smart contract may ensure that whenever tokens are paid for transference of a specific NFT, a fraction of the tokens are sent to a wallet of the creator of the NFT and the remainder of the tokens are sent to a wallet of the current owner of the NFT. As a more complex example, inter-related smart contracts allow the formation of distributed autonomous organizations (DAOs). In a DAO, modification of the DAO is permitted only according to rules that are encoded in smart contracts at the time the DAO is created. Another example use for smart contracts include multi-signature accounts that allow funds to be transferred from a wallet only when at least a predetermined number (or percentage) of users of the multi-signature account agree.

Once a smart contract is deployed to a ledger, it may be configured to listen to event updates from an "oracle," which is a cryptographically secured data source. The smart contract executes once it receives predefined events from one or more oracles. Smart contracts may be programmed in a variety of programming languages including Solidity, WebAssembly, and Digital Asset Modeling Language.

Figure 2:
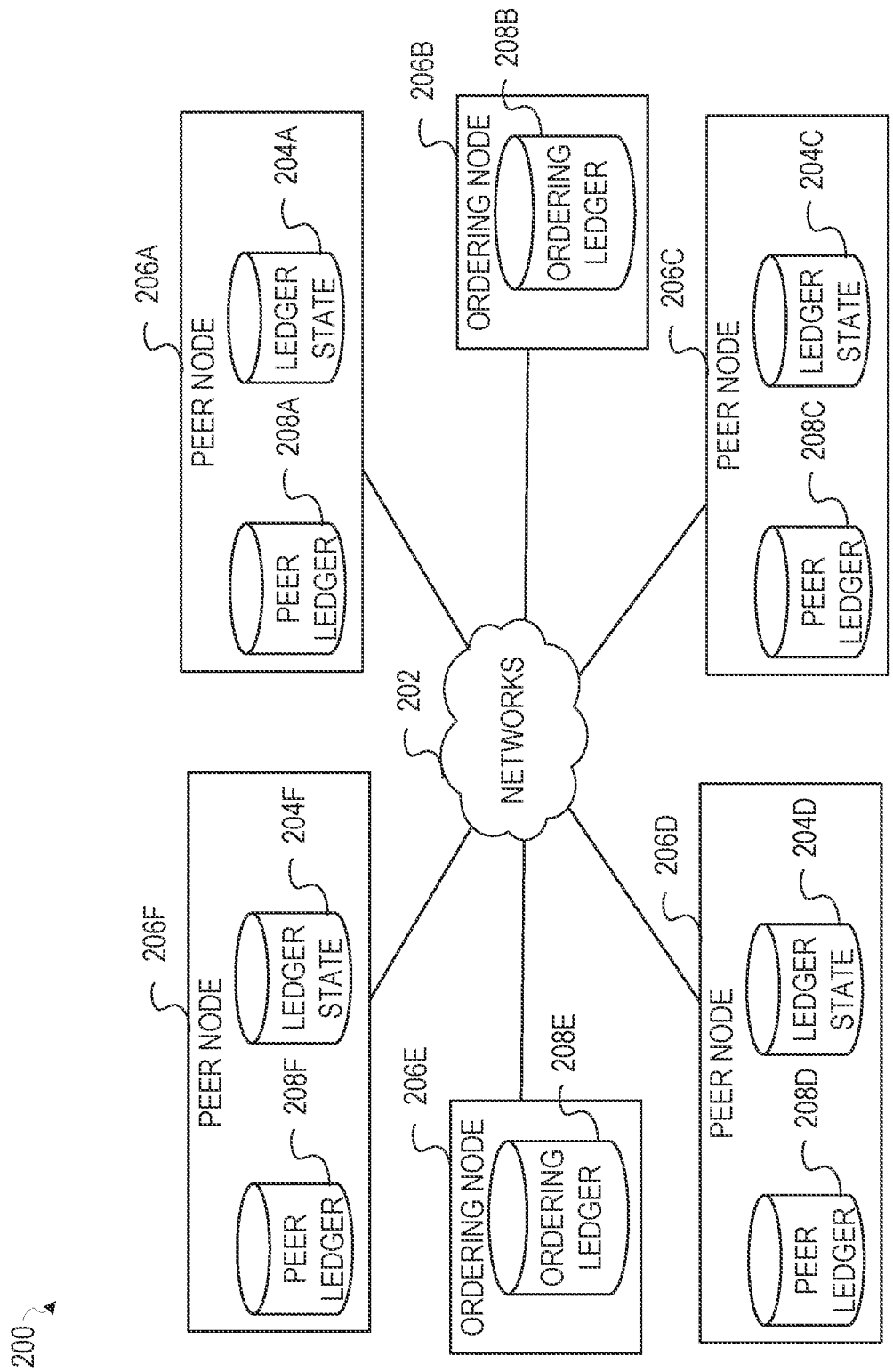

FIG. 2 is a block diagram illustrating another example of a distributed ledger system 200 that includes different types of nodes 206. Specifically, the illustrated example of FIG. 2 includes four peer nodes 206A, 206C, 206D, 206F (generically referred to as peer node(s) 206) and two ordering nodes 206B, 206E (generically referred to as ordering node(s) 206). It will be understood that fewer or more nodes can be included as desired. For example, the distributed ledger system 200 may include only one ordering node 206 or two or more ordering nodes 206. Similarly, the distributed ledger system 200 can include fewer or more peer nodes 206 as desired.

As described herein, the peer nodes 206 and ordering nodes 206 can be implemented using one or more computing devices, isolated execution environments, etc. In some examples, each peer node 206 and/or ordering node 206 can be associated with the same or different organization, entity, or user. For example, one company may be associated with or control peer nodes 206A, 206C and ordering node 206B, a second company may be associated with or control peer node 206D and ordering node 206E, and a third company may be associated with or control peer node 206F. A non-limiting example of a distributed ledger system 200 that includes peer nodes 206 and ordering nodes 206 is the Hyperledger Fabric.

For simplicity in describing FIG. 2, the peer nodes 206 and ordering nodes 206 are described with reference to a common channel that enables private communications/transactions between the illustrated nodes 206A-206F. However, it will be understood that the peer nodes 206 and ordering nodes 206 can be associated with multiple channels that each enable private communications/transactions between nodes associated with the channel and/or be associated with multiple consortiums made up of organizations that control the individual nodes 206. Further, it will be understood that each peer node 206 can include one or more peer node ledgers 208 and/or ledger states 204 and perform the functions described herein for each channel with which the peer node 206 is associated. Similarly, each ordering node 206 can include an ordering node ledger 208 and perform the functions described herein for each channel with which the ordering node 206 is associated. In some cases, each channel can include at least one ordering node 206 and multiple peer nodes 206. In certain examples, a channel is associated with multiple peer nodes 206 and only one ordering node 206. In certain cases, multiple ordering nodes 206 can be associated with the same channel.

In the illustrated example of FIG. 2, each of the peer nodes 206A, 206C, 206D, 206F includes a respective peer node ledger 208A, 208C, 208D, 208F (generically referred to as peer node ledger(s) 208) and a respective ledger state 204A, 204C, 204D, 204F (generically referred to as ledger state(s) 204), and can be used to receive proposed transactions from a client computing device (not shown), endorse transactions, communicate endorsed transactions to a client computing device or ordering node 206, validate transactions of a block, commit blocks to a respective peer node ledger 208, and/or update a respective ledger state 204.

In some examples, the peer node ledgers 208 include one or more ledgers or blockchains. Further, the peer node ledgers 208 of the different peer nodes 206 can correspond to each other, include the same or matching entries, transactions, blocks, blockchains, etc. In some cases, the peer node ledger 208 can include blocks formed from validated transactions, but may exclude invalidated transactions. In certain examples, the peer node ledgers 208 can include blocks formed from validated and invalidated (or failed) transactions. In certain examples, such as examples in which an ordering node 206 maintains an ordering node ledger 208, the peer node ledgers 208 can correspond to or match the ordering node ledgers 208 of the ordering nodes 206 and/or be different. For example, in some cases, the ordering node ledgers 208 can include all endorsed transactions, regardless of whether they are validated, and the peer node ledgers 208 can include endorsed and validated transactions but not endorsed and invalidated or failed transactions. In certain examples, the peer node ledgers 208 can include one ledger or blockchain that matches the ordering node ledger 208 and another ledger that does not match the ordering node ledger 208.

In some cases, the peer node ledger 208 is generated based on blocks received from an ordering node 206. For example, the peer node 206 can review the transactions of a received block and, if a transaction is validated, can include the transaction as part of a block for the peer node ledger 208. Accordingly, in certain examples a block of a peer node 206 may have fewer transactions (or none) compared to a corresponding block received from the ordering node 206 and/or found in the ordering node ledger 208

In some examples, when a peer node ledger 208 is implemented as a blockchain, each block of the blockchain can include a header portion (including metadata) and a body portion. The header portion and/or metadata can include a block number (e.g., which block the block is in the blockchain), one or more content identifiers for the current block, a content identifier for a previous block, one or more timestamps (e.g., when block was created, added to the blockchain), a digital certificate, a public key (of a public-private key pair), a digital signature of the peer node 206 that added the block to the blockchain, and/or indicators as to whether a transaction of the block is valid/invalid, etc. In addition, in some cases, the header portion can include hashes or content identifiers for individual transactions of a block, etc., and the body portion of a block in the blockchain can include one or more transactions or transaction data associated with a transaction.

As described herein, in some cases, the transactions in a block of a peer node blockchain can include endorsed and validated transactions and/or may include validated and invalidated transactions. In certain examples, each transaction can include header information (e.g., chaincode used to generate the transaction, software version), digital signature of the client computing device that initiated the transaction, a signature or identifier of the endorsing peer nodes 206 (peer nodes 206 that signed and/or endorsed the transaction), channel information (which channel the transaction is associated with), a signature or identifier of the ordering node 206 that ordered the transaction in the block, a proposed change to the peer node ledger 208, an expected input/output of the transaction (e.g., the content of the ledger state 204 before and after the transaction is executed), etc.

The ledger state 204 can include one or more key-value pairs reflecting the value or state of the key (of the key-value pair), and can be implemented as a database in one or more data stores of a peer node 206. In some examples, the ledger state 204 reflects a current state or value of the keys based on the transactions in the corresponding peer node ledger 208 or blockchain. As a non-limiting example, if the peer node ledger 208 reflects transactions (e.g., debits and credits) associated with a particular bank account or other intangible object, the ledger state 204 can reflect the current value of money in the bank account based on all previous transactions. As another non-limiting example, the ledger state 204 can reflect a current ownership of a car or other physical object based on previous (validated) transactions associated with the car found in the peer node ledger 208. Accordingly, as a peer node 206 adds a block with one or more transactions to a peer node ledger 208 or blockchain, the peer node 206 can update the ledger state 204 for keys that were altered based on any one or any combination of the (validated) transactions of the block. Similar to the peer node ledgers 208, the ledger states 204 of the different peer nodes 206 can correspond to each other, include the same or matching key-value pairs, etc.

Although not illustrated, it will be understood that each peer node 206 can include fewer or more components. For example, as mentioned, each peer node 206 can include multiple peer node ledgers 208, as well as chaincodes, permissions, etc. This information can be stored on one or more data store associated with the peer node 206. The permissions can indicate which channels, organizations, or other components the peer node 206 is associated with and/or what information the peer node 206 is allowed to access or edit, etc.

The chaincodes can include executable instructions that the peer node 206 is to execute and which can generate or be used to endorse or validate transactions for a block of a blockchain. For example, a chaincode can indicate that a peer node 206 is to read/write information to a ledger state 204. A client computing device (not shown) can cause the peer node 206 to execute the chaincode by providing the peer node 206 with one or more inputs. For example, if the chaincode is used to reflect the change in ownership of a car, the client computing device can identify the subject car and the identity of the parties involved in the transaction (e.g., buyer and seller). The peer node 206 can use the chaincode to verify whether the ledger state 204 includes the identified car and the parties are valid (e.g., identified owner owns the car and buyer is able to purchase the car), etc. Based on the chaincode, the relevant peer nodes 206 can endorse or validate a transaction that is to be included as part of a block in a blockchain.

In the illustrated example of FIG. 2, each of the ordering nodes 206B, 206E includes a respective ordering node ledger 208B, 208E (generically referred to as ordering node ledger(s) 208), which can be used to order endorsed transactions received from peer nodes 206, generate blocks from one or more transactions, communicate generated blocks to one or more peer nodes 206, and update a respective ordering node ledger 208. However, it will be understood that in some examples, the ordering nodes 206 do not include a ledger. In some such examples, the ordering nodes 206 may only perform the ordering and block generation functions described herein.

The ordering node ledgers 208 can include one or more ledgers or blockchains. Further, the ordering node ledgers 208 of the different ordering nodes 206 can correspond to each other, include the same or matching entries, transactions, blocks, blockchains, etc. In certain examples, the ordering ledgers 208 can include blocks formed from endorsed transactions (validated and/or invalidated or not yet validated/invalidated) transactions. In certain examples, the ordering node ledgers 208 can correspond to or match a peer node ledger 208 of a peer node 206 and/or be different. For example, in some cases, the ordering node ledgers 208 can include all endorsed transactions, regardless of whether they are validated, and the peer node ledgers 208 can include endorsed and validated transactions but not invalidated or failed transactions. Further, in some cases, a transaction in a block of a peer node ledger 208 can include a signature of a validating peer node 206, whereas a corresponding transaction in a block of an ordering node ledger 208 may not include such a signature. In some cases, the ordering node 206 does not validate the transactions of a block before posting the block to its blockchain or ordering node ledger 208. Accordingly, the blocks of an ordering node blockchain can include transactions that later fail, are invalidated, or are determined to be invalid.

In some cases, the ordering nodes 206 can be used to order transactions received from the peer nodes 206. In certain cases, the ordering of transactions can reduce the likelihood of forks of a blockchain or the ledger state 204 being different across peer nodes 206, etc. In some examples, the ordering nodes 206 can order the nodes based on a time of receipt and/or a timestamp associated with the transaction creation. In some cases, the ordering nodes 206 can order the transactions chronologically. In addition to ordering transactions, an ordering node 206 can generate a block that is to be appended to a blockchain. In some cases, as described herein, the ordering node 206 can generate a block based on a predetermined amount of time, number of transactions, size of data, etc. Further, the order of the transactions in the generated block can correspond to the order generated by the ordering node 206. Once the block is generated, the ordering node 206 can communicate the generated block to one or more peer nodes 206 for validation and commitment to a blockchain or peer node ledger 208 and/or commit the generated block to an ordering node ledger 208.

Figure 3:
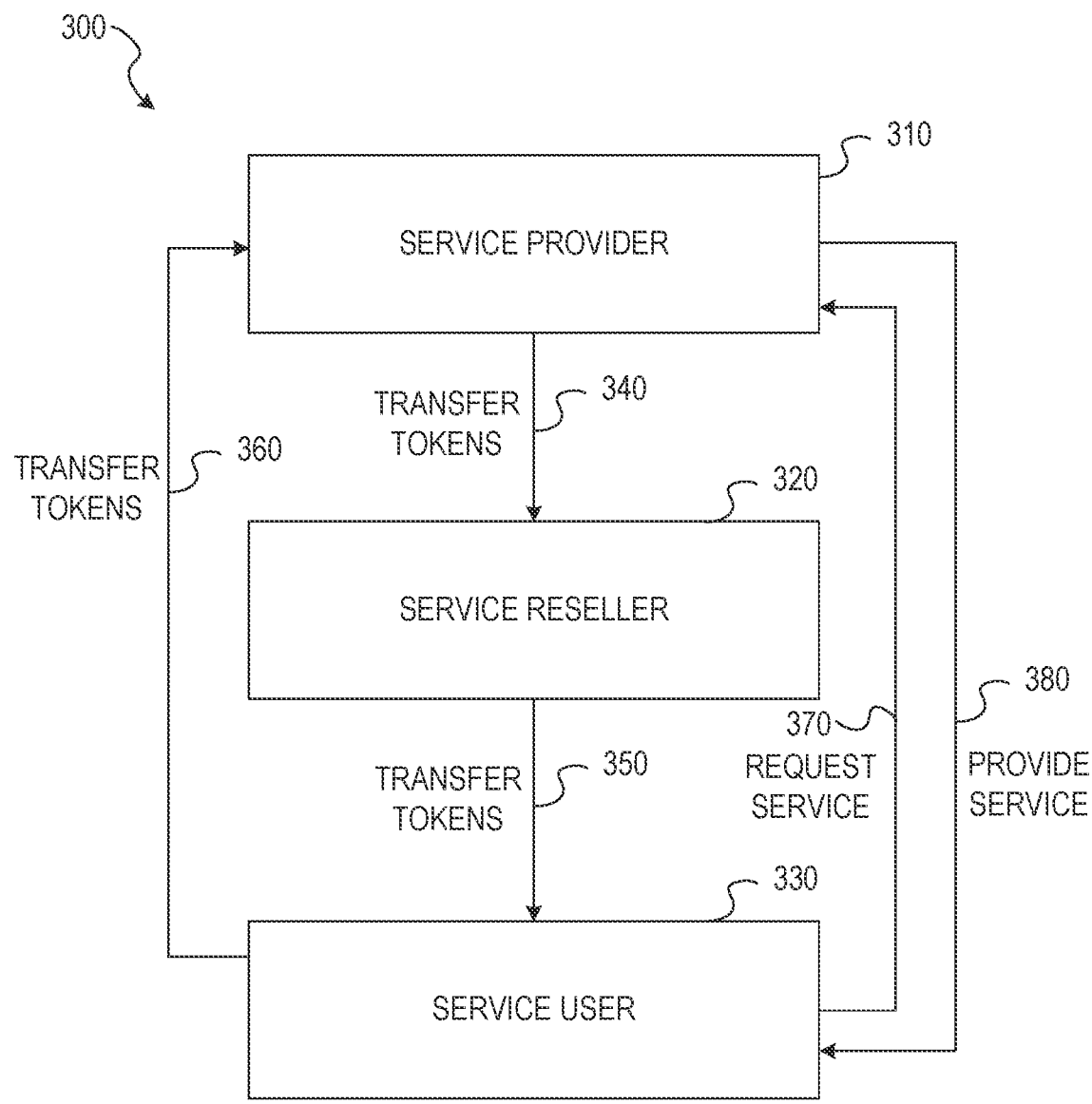
FIG. 3 shows a flow diagram of a method for transferring tokens between accounts of a blockchain to enable smart contracts for licensing software services, according to some examples.

FIG. 3 shows a flow diagram of a method 300 for transferring tokens between accounts of a blockchain to enable smart contracts for licensing software services, according to some examples. The method 300 comprises operations 340, 350, 360, 370, and 380, performed by a service provider 310, a service reseller 320, and a service user 330 in conjunction with nodes 106A-106F of FIG. 1 or nodes 206A-206F of FIG. 2.

The service provider 310 may create tokens to be used in exchange for services provided by the service provider 310. For example, ERC20 tokens may be created on the Ethereum blockchain. ERC stands for "Ethereum request for comment."

In operation 340, the service provider 310 transfers tokens to the service reseller 320. For example, the created tokens may be associated with a smart contract that allows the service reseller 320 to exchange other tokens, such as Ether, at a predetermined exchange rate for the tokens created by the service provider 310. Alternatively, the service reseller 320 and the service provider 310 may come to an agreement outside of the distributed ledger that results in the transfer of tokens in operation 340.

The service user 330, in operation 350, receives a transfer of some or all of the tokens from the service reseller 320. Again, the tokens may be associated with a smart contract that allows the service user 330 to buy the tokens of the service provider 310 at a fixed exchange rate for other tokens. In some examples, the smart contract used for the transfer of tokens in operation 340 has a lower cost per token and a higher minimum number of tokens than the smart contract used for the transfer of tokens in operation 350. Thus, the service provider 310 may sell large blocks of tokens at a wholesale rate and the service reseller 320 may sell smaller amounts of tokens at a retail rate.

In operation 360, the service user 330 transfers tokens to the service provider 310. Thereafter, the service user 330, in operation 370, requests a service from the service provider 310. The service request may include an identifier of the transaction of the operation 360. Thus, the service user 330 pays for the service using the tokens created by the service provider 310 and then requests that the service be performed.

The service provider 310, in operation 380, provides the requested service to the service user 330. For example, data processing services may be provided, a database query may be processed and results returned, access may be granted for a period of time to streaming or interactive content, or any suitable combination thereof. The tokens received by the service provider 310 may be destroyed or resold with another transfer of tokens in a future repetition of the operation 340.

Thus, by use of the method 300, a service user 330 is enabled to acquire tokens for use in receiving a service provided by the service provider 310 without having to negotiate an agreement with the service provider 310. In various examples, the service provider 310 may transfer tokens directly to the service user 330 without using the service reseller 320 as an intermediary. Additionally, the service user 330 may transfer the tokens to another service user 330 before the tokens are exchanged for the service. Thus, excess tokens may be resold, reducing the risk of overbuying tokens.

Before providing the service in operation 380, the service provider 310 may verify that the service user 330 is approved. For example, the request for the service (operation 370) may include an identifier of an account of the service user 330. The identifier may be compared with a predetermined set of approved account identifiers to determine if the service provider 310 is willing to provide services to the service user 330. If the account is an approved account, the service is provided in operation 380. Otherwise, the service is not provided. A message may be sent to the service user 330 indicating that the service will not be provided. The message may include a reason why the service will not be provided.

In some examples, the service provider 310 implements restrictions on whether the service user 330 is permitted to perform the requested service. For example, the service provider 310 may require verification that the service user 330 is not forbidden. For example, the service provider 310 may have data privacy or security rules (e.g., Know-Your-Customer financial fraud rules, a law that the service provider 310 cannot be used by users from a specific geographic area or nation state) to ensure that forbidden customers do not use or access services of the service provider 310. Further complicating the issue is the anonymous nature of the transfer of tokens via distributed ledgers. For example, a malicious user may hack a wallet used by the service provider 310 or the service user 330 and attempt to use the service provider 310 via token payment for services through a distributed ledger. The service provider 310 may not perform validation for the transfer of tokens in operation 360, but validates the requesting service user 330 in response to receiving the request for service in operation 370. For instance, the malicious user may be able to obtain the tokens, but would still need to validate the user's network addresses (e.g., network address of the client device from which the malicious user is requesting services) (e.g., allow-listed network addresses) to execute the operations. In this way, transfer of the tokens is liquid and if tokens are stolen, hacked, or if a given user is in a forbidden geographic area, the tokens cannot be used on the service provider 310. In some examples, the service provider 310 comprises a data store having allow-listed address that can use the tokens on specific wallets of the service provider 310. As an additional example, in accordance with some examples, the service provider 310 generates a billion allow-listed addresses, a given service user 330 is verified in real life (e.g., via KYC, to ensure the user is not in a forbidden geographic region), and then the verified user is assigned those addresses, such that when a search or some operation comes is requested, (1) it must have the tokens to do the operation (pre-validate customer has enough tokens), and (2) validate that the network address must exactly match the allow-listed address. In some examples, if (1) and (2) are satisfied, the operations start and the tokens are burned.

In some examples, the request for the service (operation 370) may include an identifier of an account of the service user 330. The identifier may be compared with a predetermined set of forbidden account identifiers to determine if the service provider 310 is willing to provide services to the service user 330. If the account is not a forbidden account, the service is provided in operation 380. Otherwise, the service is not provided. A message may be sent to the service user 330 indicating that the service will not be provided. The message may include a reason why the service will not be provided.

In some examples, the service provider 310 comprises multiple components that perform services. Each component of the service provider 310 may be hardcoded such that it can only spend coins from its own local wallet on its operations, and export of tokens from the wallet is restricted. In these examples, the wallet of each component can receive tokens (e.g., for use in local component operations) but cannot send tokens. In some examples, the requesting entity (e.g., the service user 330) maintains an external wallet that is external to the service provider 310. In this way, if a malicious entity (e.g., a hacker) obtains access to a given wallet, the malicious user only has access to expend those tokens that are in the locally hardcoded wallet of the compromised component, does not obtain access to the external wallet or the other components' wallets, and cannot use the stolen tokens for other components.

Figure 4:
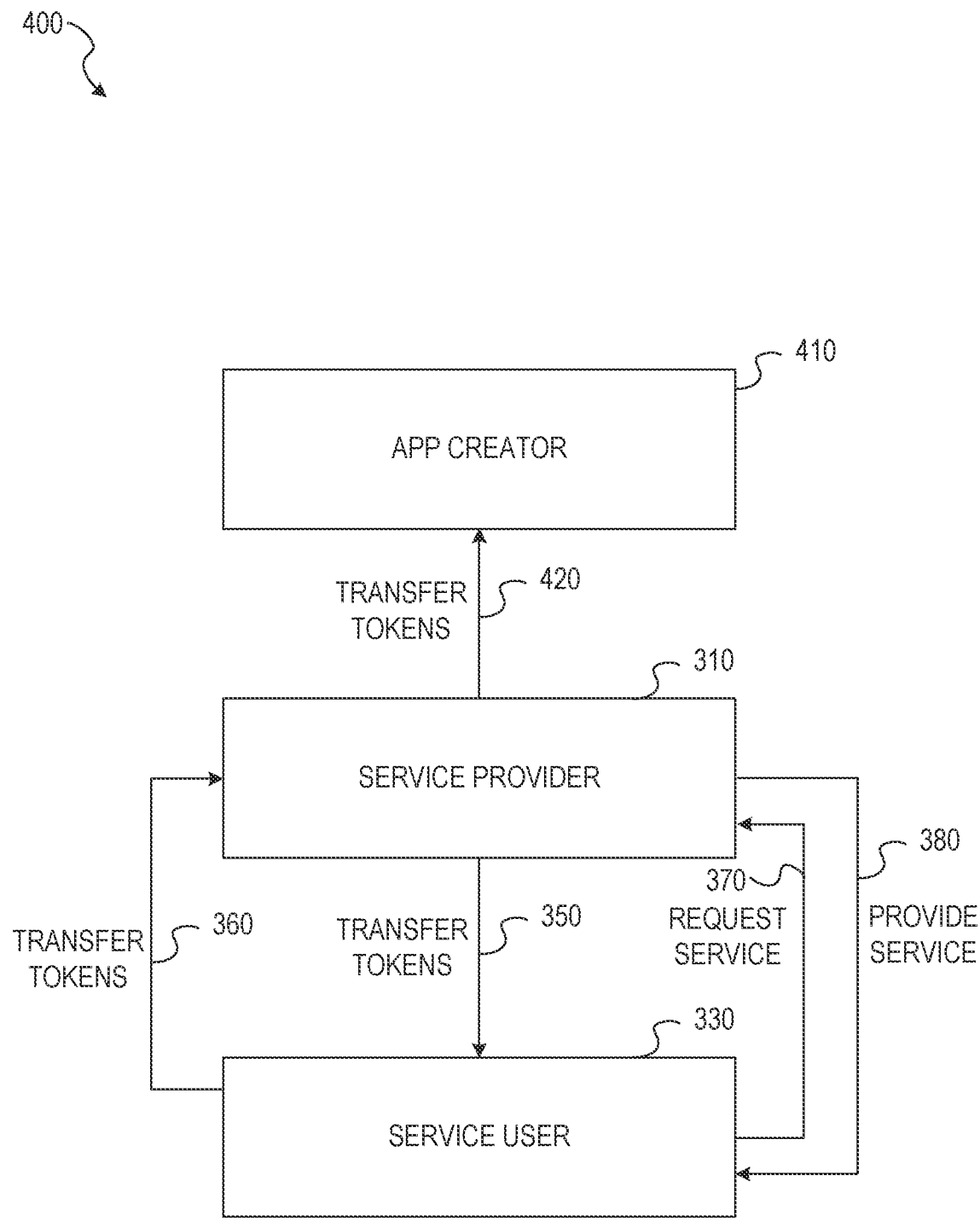
FIG. 4 shows a flow diagram of a method for transferring tokens between accounts of a blockchain to enable smart contracts for licensing software services, according to some examples.

FIG. 4 shows a flow diagram of a method 400 for transferring tokens between accounts of a blockchain to enable smart contracts for licensing software services, according to some examples. The method 400 comprises operations 350, 360, 370, 380, and 420, performed by a service provider 310, a service user 330, and an app creator 410 in conjunction with nodes 106A-106F of FIG. 1 or nodes 206A-206F of FIG. 2.

As discussed above with respect to FIG. 3, the service provider 310 transfers tokens to the service user 330 (with optional intermediate transactions, e.g., with the service reseller 320). The service user 330 transfers tokens back to the service provider 310 (operation 360), requests a service (operation 370), and the service is performed (operation 380). In operation 420, all or a portion of the tokens are transferred to an account of the app creator 410. Thus, a third party that extends the functionality of the service provider 310 is enabled to receive payment whenever the extended functionality is used.

In some examples, the app creator 410 defines the number of tokens required from the service user 330 to make use of extended functionality generated by the app creator 410 (e.g., 10 tokens for a first function and 15 tokens for a second function). The service provider 310 may define a predetermined percentage of the tokens received from the service user 330 that will be transferred to the app creator 410 (e.g., 80%). The relationship between the number of tokens and the functionality may be stored in a smart contract on the distributed ledger. Information regarding the distribution of tokens between the app creator 410 and the service provider 310 may also be stored in the smart contract.

FIG. 5 shows a flow diagram of an example method 500 for verifying transactions and performing operations. The method 500 includes operations 502, 504, 506, and 508. By way of example and not limitation, the method 500 is described as being performed by a service provider 310 in communication with the devices and nodes of FIGS. 1-3. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, case the one or more processors to perform the operations of the process 500 of FIG. 5.

In operation 502, the service provider 310 receives a request to perform an operation, the request comprising data that identifies a first account of a blockchain and a transaction on the blockchain. The transaction involves the first account and the blockchain is implemented on a plurality of nodes (e.g., the nodes 106A-106F of FIG. 1 or the nodes 206A-206F of FIG. 2). For example, the service user 330 may have an account on the distributed ledger maintained by the ledger nodes 106A-106F or 206A-206F. The user may initiate a transaction that sends tokens from the user's account to another account associated with the service provider 310. The service user 330 receives, from the distributed ledger, a unique identifier of the transaction. Thereafter, the service user 330 sends a request to the service provider 310 to perform an operation, the request including an identifier of the user's account and the unique identifier of the transaction.

The service provider 310, in operation 504, determines that the transaction transferred a predetermined number of tokens from the first account to a second account of the blockchain. The tokens are generated and managed by the blockchain and are associated with performing one or more of a plurality of operations on a data intake and query system (e.g., a data intake and query system discussed in more detail below with respect to FIGS. 6-8). For example, a request may be sent to one or more of the ledger nodes 106A-106F or 206A-206F to retrieve transaction data using the unique identifier of the transaction. In response to the request, the service provider 310 receives data indicating whether the unique identifier of the transaction actually identifies a transaction, and if so, whether the transaction was for a transfer of tokens from first account to the second account and the number of tokens transferred. The first account may be an account controlled by the user and the second account may be an account controlled by the data intake and query system. The predetermined number of tokens may be based on the transaction requested. For example, a data import operation may be associated with a first number of tokens and a data export operation may be associated with a second number of tokens different from the first number of tokens.

The service provider 310 may also verify an identity of the requester. For example, the request may have been signed by a key associated with the first account (e.g., include a signature generated using a private key associated with the first account). The service provider 310 may use a public key corresponding to the private key to verify the signature. Thus, other users would not be able to make requests that reference transactions over which they had no control.

An example signature process includes generating a hash of the message being signed and encrypting the hash using a private key. The signature and the message are sent together to a recipient. The recipient decrypts the signature using the corresponding public key and generates the hash of the message. The generated hash and the decrypted hash are compared. If the two hashes match, the signature has been verified. Otherwise, either the message was tampered with in transit or the signature was not generated by the purported signer. In some examples, the verification of the transaction includes verifying that the request is signed by a key associated with the identified account, verifying that the identified transaction occurred, verifying that the identified transaction comprised a transfer of tokens commensurate with a predetermined cost for the requested operation, verifying that the transferred tokens were not spent in servicing a previous request, or any suitable combination thereof.

Based on the determination that the transaction transferred the predetermined number of tokens from the first account to the second account, the service provider 310 performs the requested operation (operation 506). Thus, the service provider 310 only performs the requested operation if the requesting device is able to show that payment for the operation has been made using a distributed ledger. The service provider 310 marks the transaction as having been used (e.g., by updating the distributed ledger). Accordingly, a further request to perform an operation that identifies the same transaction will not be honored.

In operation 508, the service provider 310, in response to the performance of the requested operation, updates the blockchain to remove the predetermined number of tokens from the second account. Thus, after the performance of the method 500, the predetermined number of tokens associated with the requested operation have been spent by the user associated with the first account and removed from the blockchain, preventing those tokens from being used again.

In some examples, each customer of the service provider 310 is associated with two accounts. The first account is controlled by the customer. The customer buys tokens generated by the service provider 310 and places them in the first account. The tokens may be resold to other customers. To use the tokens, the customer transfers the tokens from the first account to the second account, which is controlled by the service provider 310.

The predetermined number of tokens may be a predetermined number of fungible tokens or a predetermined number of non-fungible tokens (e.g., a single non-fungible token). For example, the service provider 310 may publish a price listing that identifies a set of operations that may be requested and a corresponding number of fungible tokens for each operation. Thus, by performing the method 500 with a transaction that transfers the published number of fungible tokens for a desired operation, a customer and the service provider 310 are enabled to easily transact for the desired operation.

Alternatively, the service provider 310 may sell different tokens for each of a plurality of different types of operations. In this example, the tokens may still be fungible tokens, but a different type of token is used for each of the different types of operations. As still another alternative, a non-fungible token may be generated by the service provider 310. The non-fungible token may identify one or more operations for which the non-fungible token may be exchanged. In this example, the verifying of the transaction includes verifying that the non-fungible token is exchangeable for the requested operation.

The following are example implementations:

Example 1 is a computer-implemented method comprising: receiving, by a computing device associated with a data intake and query system, a request to perform an operation on the data intake and query system, the request including data that identifies a first account of a blockchain and a transaction on the blockchain, wherein the transaction involves the first account, and wherein the blockchain is implemented on a plurality of nodes; determining that an operation of the blockchain in processing the transaction transferred a predetermined number of tokens from the first account to a second account of the blockchain, wherein the tokens are generated and managed by the blockchain, and wherein the tokens are associated with performing one or more of a plurality of operations on the data intake and query system; based on determining that the blockchain transferred the predetermined number of tokens from the first account to the second account, performing the operation; and in response to performing of the operation on the data intake and query system, transmitting a request to the blockchain to remove the predetermined number of tokens from the second account.

In Example 2, the subject matter of Example 1 includes verifying that the request to perform the operation is signed by a key associated with the first account of the blockchain.

In Example 3, the subject matter of Examples 1-2, wherein the predetermined number of tokens are a predetermined number of fungible tokens.

In Example 4, the subject matter of Examples 1-3, wherein the predetermined number of tokens comprise one or more non-fungible tokens.

In Example 5, the subject matter of Examples 1-4, wherein: the predetermined number of tokens originated from the second account; and prior to the transaction: the predetermined number of tokens were transferred to a third account of the blockchain from the second account; and the predetermined number of were transferred to the first account from the second account.

In Example 6, the subject matter of Examples 1-5 includes verifying that the first account is associated with one of a predetermined set of approved accounts; wherein performing of the operation is further based on the verifying of the first account, wherein the tokens involved in the operation were anonymously transferred to the first account.

In Example 7, the subject matter of Examples 1-6 includes verifying that the first account is not associated with one of a predetermined set of blocked accounts; wherein the performing of the operation is further based on the verifying of the first account.

In Example 8, the subject matter of Examples 1-7, wherein: the request is a first request; the transaction is a first transaction; the predetermined number of tokens is a first predetermined number of tokens; the operation is a first operation associated with the second account of the blockchain; and the method further comprises: receiving a second request to perform a second operation on the data intake and query system, the second request comprising data that identifies the first account of the blockchain and a second transaction on the blockchain, the second transaction involving the first account; determining that the second transaction transferred a second predetermined number of tokens from the first account to a third account of the blockchain associated with the second operation; based on the determining that the second transaction transferred the second predetermined number of tokens from the first account to the third account, performing the second operation; and in response to the performing of the second operation on the data intake and query system, updating the blockchain to remove the predetermined second number of tokens from the third account.

Example 9 is a system comprising: one or more hardware processors; and a storage device storing instructions that configure the one or more hardware processors to perform operations comprising: receiving a request to perform an operation on a data intake and query system, the request comprising data that identifies a first account of a blockchain and a transaction on the blockchain, wherein the transaction involves the first account, and wherein the blockchain implemented on a plurality of nodes; determining that an operation of the blockchain in processing the transaction transferred a predetermined number of tokens from the first account to a second account of the blockchain, wherein the tokens are generated and managed by the blockchain, and wherein the tokens are associated with performing one or more of a plurality of operations on the data intake and query system; based on determining that the blockchain transferred the predetermined number of tokens from the first account to the second account, performing the operation; and in response to performing of the operation on the data intake and query system, transmitting a request to the blockchain to remove the predetermined number of tokens from the second account.

In Example 10, the subject matter of Example 9, wherein the operations further comprise: verifying that the request to perform the operation is signed by a key associated with the first account of the blockchain.

In Example 11, the subject matter of Examples 9-10, wherein the predetermined number of tokens are a predetermined number of fungible tokens.

In Example 12, the subject matter of Examples 9-11, wherein the predetermined number of tokens comprise one or more non-fungible tokens.

In Example 13, the subject matter of Examples 9-12, wherein: the predetermined number of tokens originated from the second account; and prior to the transaction: the predetermined number of tokens were transferred to a third account of the blockchain from the second account; and the predetermined number of were transferred to the first account from the second account.

In Example 14, the subject matter of Examples 9-13, wherein the operations further comprise: verifying that the first account is associated with one of a predetermined set of approved accounts; wherein performing of the operation is further based on the verifying of the first account.

In Example 15, the subject matter of Examples 9-14, wherein the operations further comprise: verifying that the first account is not associated with one of a predetermined set of blocked accounts; wherein the performing of the operation is further based on the verifying of the first account.

In Example 16, the subject matter of Examples 9-15, wherein: the request is a first request; the transaction is a first transaction; the predetermined number of tokens is a first predetermined number of tokens; the operation is a first operation associated with the second account of the blockchain; and the operations further comprise: receiving a second request to perform a second operation on the data intake and query system, the second request comprising data that identifies the first account of the blockchain and a second transaction on the blockchain, the second transaction involving the first account; determining that the second transaction transferred a second predetermined number of tokens from the first account to a third account of the blockchain associated with the second operation; based on the determining that the second transaction transferred the second predetermined number of tokens from the first account to the third account, performing the second operation; and in response to the performing of the second operation on the data intake and query system, updating the blockchain to remove the predetermined second number of tokens from the third account.

Example 17 is a non-transitory machine-readable medium storing instructions that, when executed by one or more hardware processors of a machine, cause the machine to perform operations comprising: receiving a request to perform an operation on a data intake and query system, the request comprising data that identifies a first account of a blockchain and a transaction on the blockchain, wherein the transaction involves the first account, and wherein the blockchain implemented on a plurality of nodes; determining that an operation of the blockchain in processing the transaction transferred a predetermined number of tokens from the first account to a second account of the blockchain, wherein the tokens are generated and managed by the blockchain, and wherein the tokens are associated with performing one or more of a plurality of operations on the data intake and query system; based on determining that the blockchain transferred the predetermined number of tokens from the first account to the second account, performing the operation; and in response to performing of the operation on the data intake and query system, transmitting a request to the blockchain to remove the predetermined number of tokens from the second account.

In Example 18, the subject matter of Example 17, wherein the operations further comprise: verifying that the request to perform the operation is signed by a key associated with the first account of the blockchain.

In Example 19, the subject matter of Examples 17-18, wherein the predetermined number of tokens are a predetermined number of fungible tokens.

In Example 20, the subject matter of Examples 17-19, wherein the predetermined number of tokens comprise one or more non-fungible tokens.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
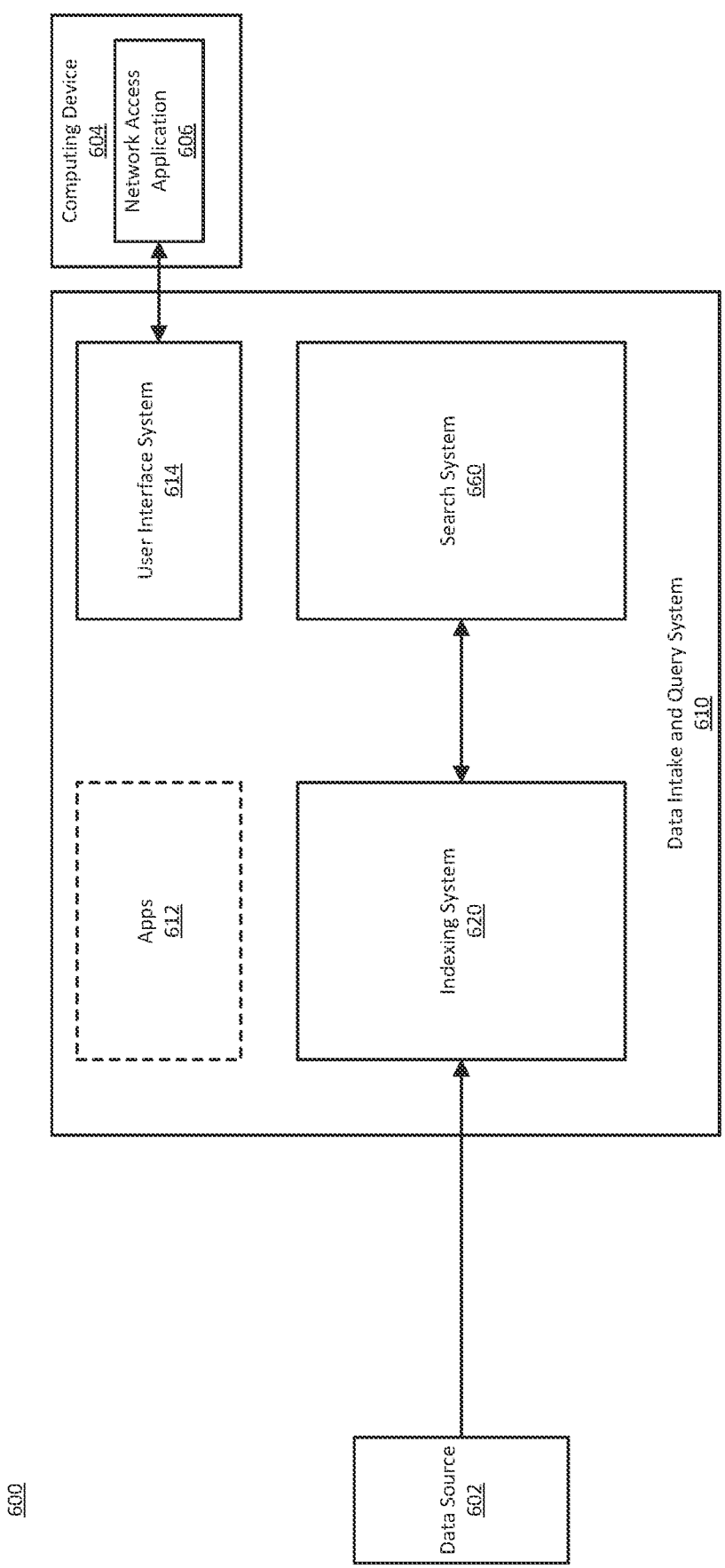
FIG. 6 is a block diagram illustrating an example computing environment that includes a data intake and query system.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can execute on a single computing device, or may be distributed over multiple computing devices. For example, the program code can include instructions for executing both indexing and search components (which may be part of the indexing system 620 and/or the search system 660, respectively), and can be executed on a computing device that also provides the data source 602. As another example, the program code can execute on one computing device, where the program code executes both indexing and search components, while another copy of the program code executes on a second computing device that provides the data source 602. As another example, the program code can execute only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing 620 system. As discussed in greater detail below, the search system 660 enables users associated with the computing environment 600 (and possibly also other users) to navigate the data, generate reports, and visualize results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries to the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, which can a network interface of the client computing device 604 to communicate, over a network, with the user interface system 614 of the data intake and query system #A110. The user interface system 614 can use the network access application 606 to generate user interfaces that enable a user to interact with the data intake and query system #A110. A web browser is one example of a network access application. A shell tool can also be used as a network access application. In some examples, the data intake and query system 610 is an application executing on the computing device 606. In such examples, the network access application 606 can access the user interface system 614 without needed to go over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
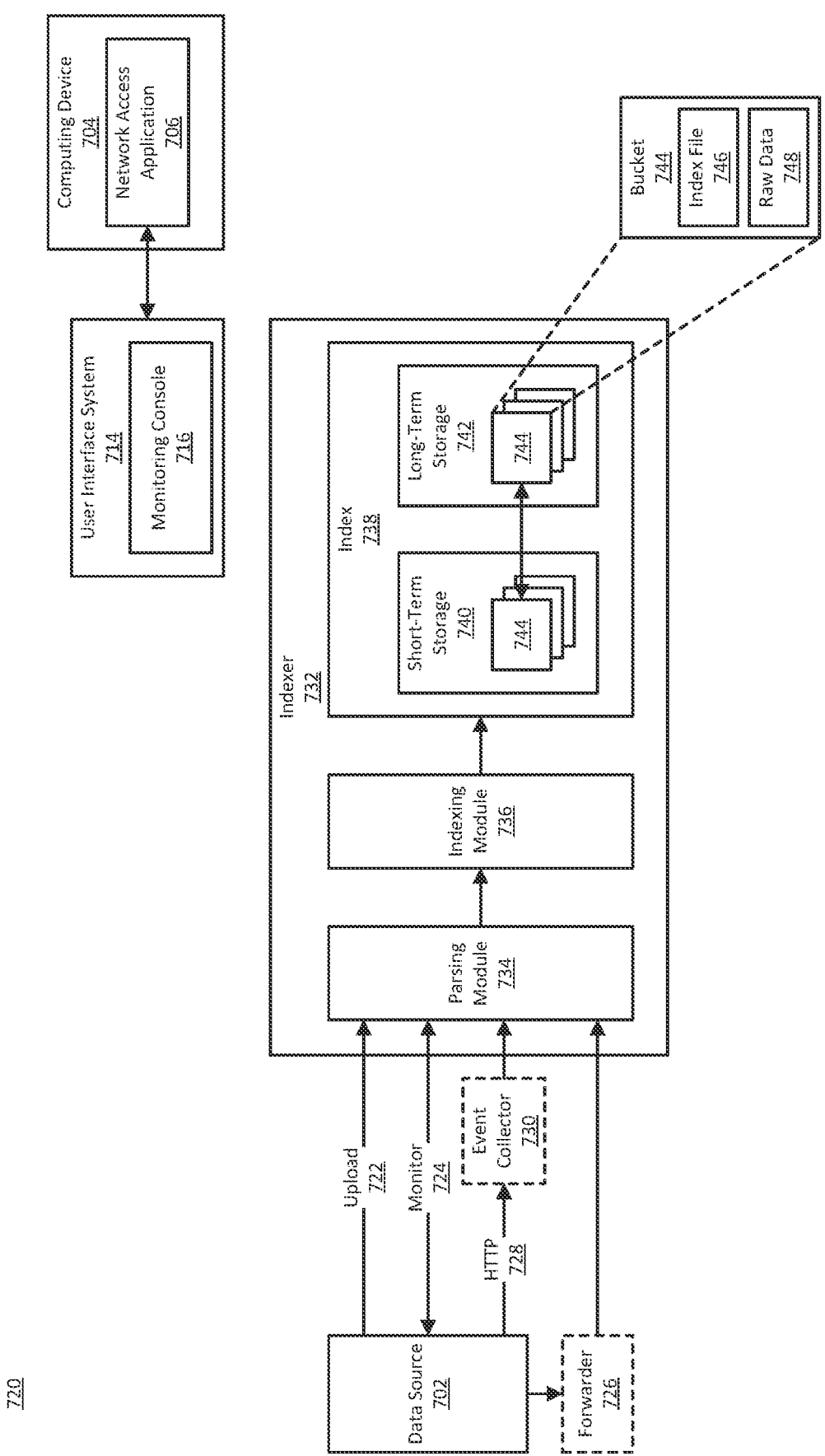
FIG. 7 is a block diagram illustrating in greater detail an example of an indexing system of a data intake and query system, such as the data intake and query system of FIG. 6.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for indexing; configuring the indexer 732 to index the data from the data source 732; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can instruct the indexing system to 702 to specify a file for uploading into the indexer 732. For example, the monitoring console 716 can include commands or an interface through which the user can specify where the file is located (e.g., on which computing device and/or in which directory of a file system) and the name of the file. Once uploading is initiated, the indexer 732 processes the file, as discussed further below. Uploading is a manual process and occurs when instigated by a user. For automated data ingestion, the other ingestion methods are used.

The monitor 724 method enables the indexing system 702 to monitor the data source 702 and continuously or periodically obtain data produced by the data source 702 for ingestion by the indexer 732. For example, using the monitoring console 716, a user can specify a file or directory for monitoring. In this example, the indexing system 702 can execute a monitoring process that detects whenever data is added to the file or directory and causes the data to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events or event data to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated to facilitate discussion, with the understanding that implementations with other components are possible to achieve the same functionality.

The parsing module 734 determines information about event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field or using machine learning.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing component 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can include more than one index and can include indexes of different types. For example, the indexer 732 can include event indexes, which impose minimal structure on stored data and can accommodate any type of data. As another example, the indexer 732 can include metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing component 734 may add fields to event data and/or perform transformations on fields in the event data, and thus a raw data file 748 can include, in addition to or instead of raw data, what is referred to herein as enriched raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data in the raw data file 748 with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may move from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the index 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
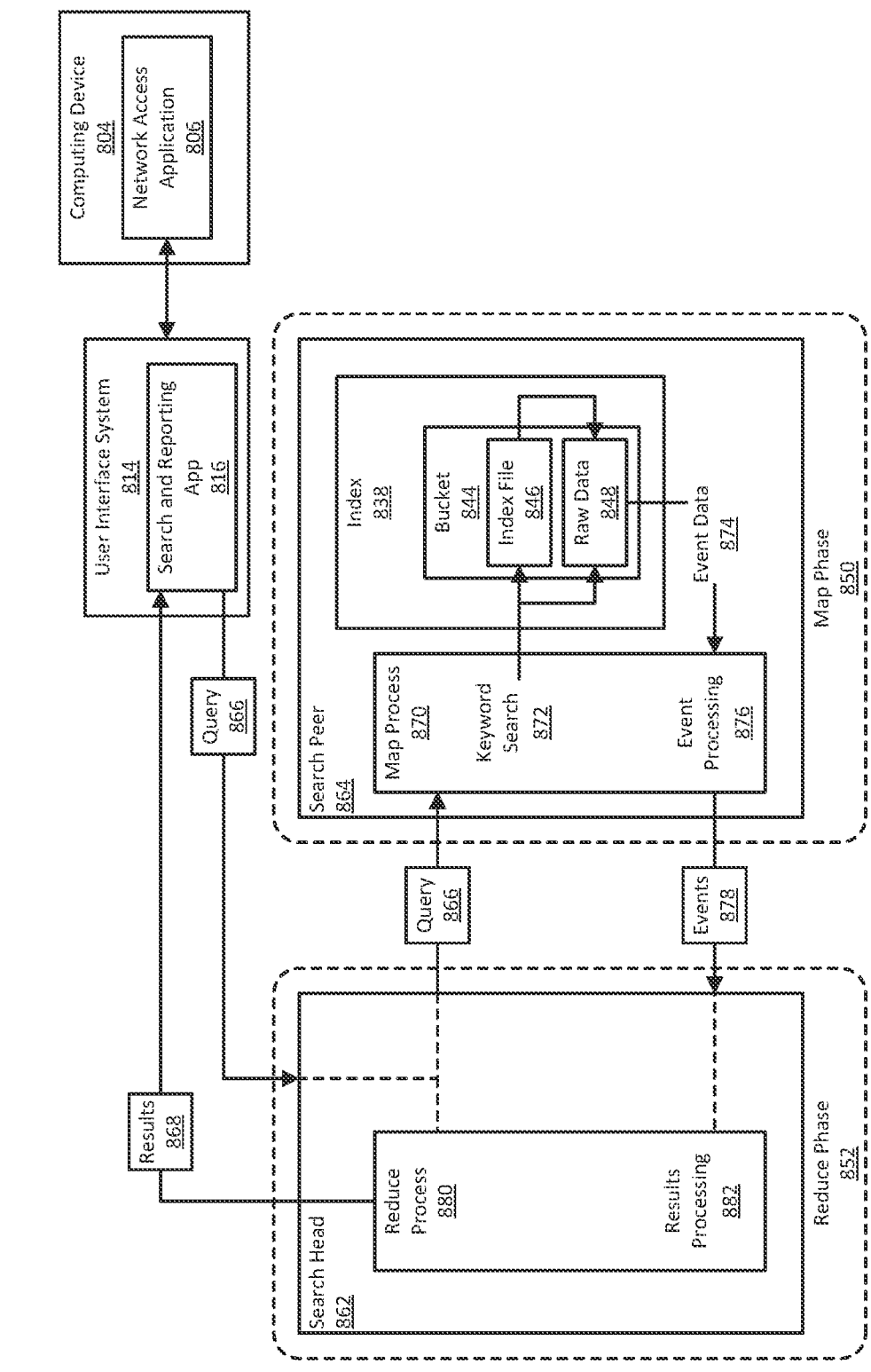
FIG. 8 is a block diagram illustrating in greater detail an example of the search system of a data intake and query system, such as the data intake and query system of FIG. 6.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 874 using search terms specified in the search query #A66. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data #A74 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the events. The results processing 882 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

Through results processing 882, the reduce process 880 produces the events found by processing the search query 866, as well as some information about the events, which the search head 862 outputs to the search and reporting app 816 as search results 868. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Chloropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 816. The process of further investigation may be referred to as drilldown. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such examples may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective examples may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some examples the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some examples, certain operations, acts, events, or functions of any of the algorithms described herein can be performed in a different sequence, can be added, merged, or left out altogether (e.g., not all are necessary for the practice of the algorithms). In certain examples, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   receiving, by a computing device that is associated with a data intake and query system and executes a smart contract, a first request by a first requester to perform a first processing operation via the data intake and query system, wherein an identity of the first requester is validated by a hash algorithm, the first request including data that uniquely identifies a first account of a blockchain and a uniquely identifies a transaction on the blockchain that has already occurred, wherein the transaction involves the first account, and wherein the blockchain is implemented on a plurality of nodes, wherein the first request is signed by a private key associated with the first account, wherein the first account is a verified account and is not a blocked account;
   decrypting, with a corresponding public key, the signed first request to verify its authenticity;
   in response to successfully verifying the first request, determining that an operation of the blockchain in processing the transaction transferred a predetermined number of tokens from the first account to a second account of the blockchain, wherein the tokens are generated and managed by the blockchain, wherein the predetermined number of tokens were anonymously transferred to the first account, and wherein the tokens are associated with performing one or more of a plurality of processing operations via the data intake and query system that are based on event data generated from raw machine data produced within an information technology environment;
   in response to determining that the blockchain transferred the predetermined number of tokens from the first account to the second account, executing, by the computing device, the smart contract to perform the first processing operation via the data intake and query system, wherein the first processing operation comprises at least one of transforming at least a portion of the raw machine data into searchable event data or processing the searchable event data; and
   in response to performing of the first processing operation via the data intake and query system, updating a distributed ledger that the transaction has been used and transmitting a second request to the blockchain to remove the predetermined number of tokens from the second account, wherein updating the distributed ledger that the transaction has been used prevents a second operating from being performed which uniquely identifies that transaction.

2. The computer-implemented method of claim 1, wherein executing the smart contract to perform the first processing operation is further in response to performing at least one of:
   verifying that the first account is associated with one of a predetermined set of approved accounts; or
   verifying that the first account is not associated with one of a predetermined set of blocked accounts.

3. The computer-implemented method of claim 1, wherein the predetermined number of tokens are a predetermined number of fungible tokens.

4. The computer-implemented method of claim 1, wherein the predetermined number of tokens comprise one or more non-fungible tokens.

5. The computer-implemented method of claim 1, wherein:
the predetermined number of tokens originated from the second account; and
prior to the transaction:
the predetermined number of tokens were transferred to a third account of the blockchain from the second account; and
the predetermined number of tokens were transferred to the first account from the second account.

6. The computer-implemented method of claim 1, further comprising:
verifying that the first account is associated with one of a predetermined set of approved accounts;
wherein performing of the first processing operation is further based on the verifying of the first account.

7. The computer-implemented method of claim 1, further comprising:
verifying that the first account is not associated with one of a predetermined set of blocked accounts;
wherein the performing of the first processing operation is further based on the verifying of the first account.

8. The computer-implemented method of claim 1, wherein:
the request is a first request;
the transaction is a first transaction;
the predetermined number of tokens is a first predetermined number of tokens;
the first processing operation is a first operation associated with the second account of the blockchain; and
the method further comprises:
receiving a second request to perform a second processing operation via the data intake and query system, the second request comprising data that identifies the first account of the blockchain and a second transaction on the blockchain, the second transaction involving the first account;
determining that the second transaction transferred a second predetermined number of tokens from the first account to a third account of the blockchain associated with the second processing operation;
based on the determining that the second transaction transferred the second predetermined number of tokens from the first account to the third account, performing the second processing operation; and
in response to the performing of the second processing operation via the data intake and query system, updating the blockchain to remove the predetermined second number of tokens from the third account.

9. A system comprising:
one or more hardware processors; and
a storage device storing instructions that configure the one or more hardware processors to perform operations comprising:
receiving a first request from a first request, for the one or more hardware processors that are associated with a data intake and query system and execute a smart contract, to perform a first processing operation via the data intake and query system, wherein an identity of the first requester is validated by a hash algorithm, the first request comprising data that uniquely identifies a first account of a blockchain and uniquely identifies a transaction on the blockchain that has already occurred, wherein the transaction involves the first account, and wherein the blockchain implemented on a plurality of nodes, wherein the first request is signed by a private key associated with the first account, wherein the first account is a verified account and is not a blocked account;
decrypting, with a corresponding public key, the signed first request to verify its authenticity;
in response to successfully verifying the first request, determining that an operation of the blockchain in processing the transaction transferred a predetermined number of tokens from the first account to a second account of the blockchain, wherein the tokens are generated and managed by the blockchain, wherein the predetermined number of tokens were anonymously transferred to the first account, and wherein the tokens are associated with performing one or more of a plurality of processing operations via the data intake and query system that are based on event data generated from raw machine data produced within an information technology environment;
in response to determining that the blockchain transferred the predetermined number of tokens from the first account to the second account, executing, by the one or more hardware processors, the smart contract to perform the first processing operation via the data intake and query system, wherein the first processing operation comprises at least one of transforming at least a portion of the raw machine data into searchable event data or processing the searchable event data; and
in response to performing of the first processing operation via the data intake and query system, updating a distributed ledger that the transaction has been used and transmitting a second request to the blockchain to remove the predetermined number of tokens from the second account, wherein updating the distributed ledger that the transaction has been used prevents a second operating from being performed which uniquely identifies that transaction.

10. The system of claim 9, wherein executing the smart contract to perform the first processing operation is further in response to performing at least one of:
verifying that the first account is associated with one of a predetermined set of approved accounts; or
verifying that the first account is not associated with one of a predetermined set of blocked accounts.

11. The system of claim 9, wherein the predetermined number of tokens are a predetermined number of fungible tokens.

12. The system of claim 9, wherein the predetermined number of tokens comprise one or more non-fungible tokens.

13. The system of claim 9, wherein:
the predetermined number of tokens originated from the second account; and
prior to the transaction:
the predetermined number of tokens were transferred to a third account of the blockchain from the second account; and
the predetermined number of tokens were transferred to the first account from the second account.

14. The system of claim 9, wherein the operations further comprise:
verifying that the first account is associated with one of a predetermined set of approved accounts;
wherein performing of the first processing operation is further based on the verifying of the first account.

15. The system of claim 9, wherein the operations further comprise:
  verifying that the first account is not associated with one of a predetermined set of blocked accounts;
  wherein the performing of the first processing operation is further based on the verifying of the first account.

16. The system of claim 9, wherein:
  the request is a first request;
  the transaction is a first transaction;
  the predetermined number of tokens is a first predetermined number of tokens;
  the first processing operation is a first operation associated with the second account of the blockchain; and
  the operations further comprise:
    receiving a second request to perform a second processing operation via the data intake and query system, the second request comprising data that identifies the first account of the blockchain and a second transaction on the blockchain, the second transaction involving the first account;
    determining that the second transaction transferred a second predetermined number of tokens from the first account to a third account of the blockchain associated with the second processing operation;
    based on the determining that the second transaction transferred the second predetermined number of tokens from the first account to the third account, performing the second processing operation; and
    in response to the performing of the second processing operation via the data intake and query system, updating the blockchain to remove the predetermined second number of tokens from the third account.

17. A non-transitory machine-readable medium storing instructions that, when executed by one or more hardware processors of a machine, cause the machine to perform operations comprising:
  receiving a first request from a first requester, for the one or more hardware processors that are associated with a data intake and query system and execute a smart contract, to perform a first processing operation via the data intake and query system, wherein an identity of the first requester is validated by a hash algorithm, the first request comprising data that uniquely identifies a first account of a blockchain and uniquely identifies a transaction on the blockchain that has already occurred, wherein the transaction involves the first account, and wherein the blockchain implemented on a plurality of nodes, wherein the first request is signed by a private key associated with the first account, wherein the first account is a verified account and is not a blocked account;
  decrypting, with a corresponding public key, the signed first request to verify its authenticity
  in response to successfully verifying the first request, determining that an operation of the blockchain in processing the transaction transferred a predetermined number of tokens from the first account to a second account of the blockchain, wherein the tokens are generated and managed by the blockchain, wherein the predetermined number of tokens were anonymously transferred to the first account, and wherein the tokens are associated with performing one or more of a plurality of processing operations via the data intake and query system that are based on event data generated from raw machine data produced within an information technology environment;
  in response to determining that the blockchain transferred the predetermined number of tokens from the first account to the second account, executing, by the one or more hardware processors, the smart contract to perform the first processing operation via the data intake and query system, wherein the first processing operation comprises at least one of transforming at least a portion of the raw machine data into searchable event data or processing the searchable event data; and
  in response to performing of the first processing operation via the data intake and query system, transmitting updating a distributed ledger that the transaction has been used and a second request to the blockchain to remove the predetermined number of tokens from the second account, wherein updating the distributed ledger that the transaction has been used prevents a second operating from being performed which uniquely identifies that transaction.

18. The non-transitory machine-readable medium of claim 17, wherein executing the smart contract to perform the first processing operation is further in response to performing at least one of:
  verifying that the first account is associated with one of a predetermined set of approved accounts; or
  verifying that the first account is not associated with one of a predetermined set of blocked accounts.

19. The non-transitory machine-readable medium of claim 17, wherein the predetermined number of tokens are a predetermined number of fungible tokens.

20. The non-transitory machine-readable medium of claim 17, wherein the predetermined number of tokens comprise one or more non-fungible tokens.

* * * * *